United States Patent
Kerbler et al.

(10) Patent No.: US 10,125,721 B2
(45) Date of Patent: Nov. 13, 2018

(54) NACELLE FOR A TURBOJET ENGINE WITH A VARIABLE NOZZLE

(71) Applicant: AIRCELLE, Gonfreville l'Orcher (FR)

(72) Inventors: Olivier Kerbler, Antony (FR); Olivier Gilo, Versailles (FR); Patrick Gonidec, Bretx (FR)

(73) Assignee: AIRCELLE, Gonfreville l'Orcher (FR)

( * ) Notice: Subject to any disclaimer, the term of this patent is extended or adjusted under 35 U.S.C. 154(b) by 338 days.

(21) Appl. No.: 14/987,302

(22) Filed: Jan. 4, 2016

(65) Prior Publication Data

US 2016/0115902 A1  Apr. 28, 2016

Related U.S. Application Data

(63) Continuation of application No. PCT/FR2014/051733, filed on Jul. 4, 2014.

(30) Foreign Application Priority Data

Jul. 4, 2013  (FR) ..................... 13 56536

(51) Int. Cl.
| | |
|---|---|
| *F02K 1/12* | (2006.01) |
| *B64D 29/06* | (2006.01) |
| *B64D 33/04* | (2006.01) |
| *B64C 15/02* | (2006.01) |
| *F02K 1/76* | (2006.01) |

(52) U.S. Cl.
CPC ............ *F02K 1/1261* (2013.01); *B64D 29/06* (2013.01); *B64D 33/04* (2013.01); *F02K 1/1207* (2013.01); *F02K 1/1253* (2013.01); *B64C 15/02* (2013.01); *F02K 1/12* (2013.01); *F02K 1/763* (2013.01)

(58) Field of Classification Search
CPC ........ F02K 1/12; F02K 1/1207; F02K 1/1253; F02K 1/1261; F02K 1/763; F02K 1/70; F02K 1/72; F02K 1/68; F02K 1/09; F02K 1/54
See application file for complete search history.

(56) References Cited

U.S. PATENT DOCUMENTS

| | | | |
|---|---|---|---|
| 2,976,676 A | * | 3/1961 | Kress ................... F02K 1/1253 239/127.3 |
| 3,491,950 A | * | 1/1970 | Naud .................... F02K 1/1207 239/265.39 |
| 3,599,875 A | | 8/1971 | Wynosky et al. |
| 4,141,501 A | * | 2/1979 | Nightingale .......... F02K 1/1261 239/265.39 |
| 5,117,630 A | | 6/1992 | Cariola et al. |

FOREIGN PATENT DOCUMENTS

| | | |
|---|---|---|
| DE | 36 19 652 C1 | 10/1990 |
| FR | 2 934 326 A1 | 1/2010 |
| FR | 2 936 222 | 3/2010 |
| FR | 2 957 979 A1 | 9/2011 |
| FR | 2 978 802 A1 | 2/2013 |

OTHER PUBLICATIONS

International Search Report dated Nov. 3, 2014 in International Application No. PCT/FR2014/051733.

* cited by examiner

*Primary Examiner* — Andrew Nguyen
*Assistant Examiner* — Stephanie Cheng
(74) *Attorney, Agent, or Firm* — Burris Law, PLLC (57) ABSTRACT

The present disclosure provides a turbojet engine nacelle having a downstream section including a cowl which is ended with a hinged flap constituting a nozzle. In particular, the hinged flap is hingedly and translatably hinged to the cowl.

6 Claims, 8 Drawing Sheets

NACELLE FOR A TURBOJET ENGINE WITH A VARIABLE NOZZLE

CROSS-REFERENCE TO RELATED APPLICATIONS

This application is a continuation of International Application No. PCT/FR2014/051733, filed on Jul. 4, 2014, which claims the benefit of FR 13/56536, filed on Jul. 4, 2013. The disclosures of the above applications are incorporated herein by reference.

FIELD

The present disclosure relates to an adaptive nozzle device for a turbojet engine nacelle of an aircraft. The present disclosure also relates to a thrust reverser including such adaptive nozzle device as well as a nacelle for a turbojet engine comprising at least such adaptive nozzle device.

BACKGROUND

The statements in this section merely provide background information related to the present disclosure and may not constitute prior art.

An aircraft is powered by one or several turbojet engine(s) each housed within a nacelle. The nacelle generally has a tubular structure comprising an air inlet upstream of the turbojet engine, a medium section intended to surround a fan of the turbojet engine, a downstream section accommodating the thrust reversal means and intended to surround the combustion chamber of the turbojet engine, and is generally ended by an ejection nozzle located downstream of the turbojet engine.

This nacelle is intended to accommodate a bypass turbojet engine able to generate, by means of the blades of the rotating fan, a hot air flow coming from the combustion chamber of the turbojet engine, and a cold air flow which circulates outside the turbojet engine through an annular channel called flow path.

The thrust reverser device is, during the landing of the aircraft, intended to improve the braking capacity thereof by redirecting forward at least a part of the thrust generated by the turbojet engine.

To do this, the thrust reverser device obstructs at least partially the flow path of the cold air flow and directs the latter forward of the nacelle, thereby generating a counter-thrust which is added to the braking of the wheels of the aircraft.

The means implemented to achieve this reorientation of the cold flow vary according to the type of the thrust reverser. The structure of a thrust reverser generally comprises one or several movable cowl(s) displaceable between, on the one hand, a deployed position in which they open within the nacelle a passage intended for the diverted flow, and on the other hand, a retracted position in which they close this passage. These cowls may fulfill a function of deflection or simply activation of other diverting means.

Moreover, besides its thrust reversal function, the thrust reverser cowl belongs to the rear section of the nacelle and has a downstream part forming the ejection nozzle aiming to channel the ejection of the air flow.

In the case of a nozzle called adaptive or variable nozzle, a section of the ejection nozzle can be adapted depending on different flight phases, namely the take-off, the rising, the cruise, the descent and the landing phases of the aircraft.

Advantages of such adaptive nozzles are particularly the noise reduction, the improvement of the motor operability or the decrease of the fuel consumption.

Of course, the nacelles which are not equipped with thrust reverser device, called smooth nacelles, may be independently equipped with a variable nozzle device.

The variation of this section, thus resulting in the variation of the section of the cold air flow path is performed by means of one or more flap(s) of displaceable nozzle.

There are several manners to make the nozzle section vary at the outlet of the nacelle.

According to a first type of nozzle, the variation of the outlet section of the cold air flow path is achieved due to a plurality of flaps, also called deflectors, movably mounted in rotation to a downstream end of the cowl, and adapted to pivot between a retracted position in which they are in the continuity to the aerodynamic line of the secondary air flow path, a deployed position causing a variation of the nozzle section, and a plurality of intermediate positions to said retracted and deployed positions.

This type of adaptive nozzle is particularly suitable for performing a reduction of section relative to its nominal position in continuity to the aerodynamic line of the nacelle.

Systems of adaptive nozzles with pivoting flaps are described in particular in documents FR 2 936 222 and FR 2 934 326.

It will be noted that the nozzle flap can also in some cases serve as blocking flap of the flow path for the thrust reverser device.

According to a second form, the variation of the outlet section of the cold air flow path is achieved by translation of a terminal part of a nozzle cowl.

When the variable nozzle device is associated to a thrust reverser device, the variation of the nozzle section can be performed by partial translation (that is to say shorter than a reversal translation and not activating the diverting means or the cascade vanes) of the cowl of the thrust reverser.

Unlike the previous form, this type of adaptive nozzle is particularly suitable for performing an increase of section relative to its nominal position in continuity to the aerodynamic line of the nacelle.

The nominal position then corresponds generally to the smallest nozzle section.

Some translation systems allow a reduction of the nozzle section, but have in this case only but a small reduction amplitude.

Indeed, in order to obtain a reduction of the nozzle, a translation is performed, not downstream of the nacelle, but upstream of the latter. Given the presence of the medium section and the provision for an overlapping of structures introducing aerodynamic accidents, but also of the cascade vanes housed in the thrust reverser cowl, the amplitude of such movement remains reduced.

Systems of adaptive nozzles with translating cowl are described particularly in documents FR 2 978 802 and FR 2 957 979.

SUMMARY

The present disclosure provides a nacelle for a turbojet engine having a downstream section comprising at least one cowling ended by at least one hinged flap forming a nozzle, characterized in that said flap is pivotally and translatably hinged relative to said cowling.

Thus, by providing a nozzle flap pivotally and translatably hinged, it is possible to actuate in rotation or in translation said flap depending on the desired variation of section.

A pivoting of the flap may be used to reduce the nozzle section while a translation of the flap will allow increasing the nozzle section relative to the nominal position of the flap.

Advantageously, the flap is movable in translation between a closed position in which it comes in continuity to the cowling and an open position in which it increases the outlet section, and can also open an exhaust space between itself and said cowling to create a tertiary nozzle.

According to one form of the present disclosure, the downstream section is equipped with at least one thrust reverser device. In such case, the movement of the flap is defined relative to the movable thrust reverser cowl, and the simultaneous translation of the thrust reverser cowl and of the nozzle upon activation of the thrust reverser device is not a translation of the nozzle relative to said movable thrust reverser cowl.

According to a first mode of implementation, the flap has at least one rotation index able to cooperate with a corresponding rotation pad of the nacelle, the rotation index being received, when the flap is in a nominal position, inside a notch of the pad opening onto at least one guide rail associated to the nacelle, said rail being able to receive the rotation index and consequently to guide the nozzle flap in translation during a variation of the nozzle section by translation of said flap.

Advantageously, the flap has at least one translation index received inside the guide rail when the flap is in a nominal position, said rail also having a lateral notch designed to allow the passage of the translation index during a variation of the nozzle section by pivoting said flap.

Complementarily, the flap or the nacelle has at least one additional translation guiding slide associated to a complementary tilting slide of the nacelle or of the flap and designed to guide the pivoting of the flap, each of the tilting and guiding slides receiving a common translation index. In one form, the translation index is carried by a control rod.

More advantageously, the nacelle has an additional slide extending along the translation direction of the flap and ended upstream by a corresponding off-centered notch in the rotation pad, said additional slide and the corresponding off-centered notch forming an upstream abutment and a downstream abutment for one end of a drive rod of the flap.

According to a second mode of implementation, the nozzle flap comprises at least one upstream module, movably mounted in translation, and pivotally supporting at least one terminal downstream module.

Advantageously, the upstream module is common to several downstream modules.

According to a third mode of implementation, the nozzle flap is equipped with at least one pivoting drive means.

Advantageously, the nozzle flap(s) is/are designed to enable performing the thrust vectoring.

In an advantageously complementary manner, the nozzle, and more particularly its flaps, are equipped with chevrons. Such chevrons allow in particular modifying the stream flows at the nozzle outlet.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Furthermore, the terms «upstream» and «downstream» are used in the description with reference to the air flowing direction in the nacelle, the upstream of the nacelle corresponding to an air inlet area while the downstream corresponds to an air exhaust area.

Figure 1:
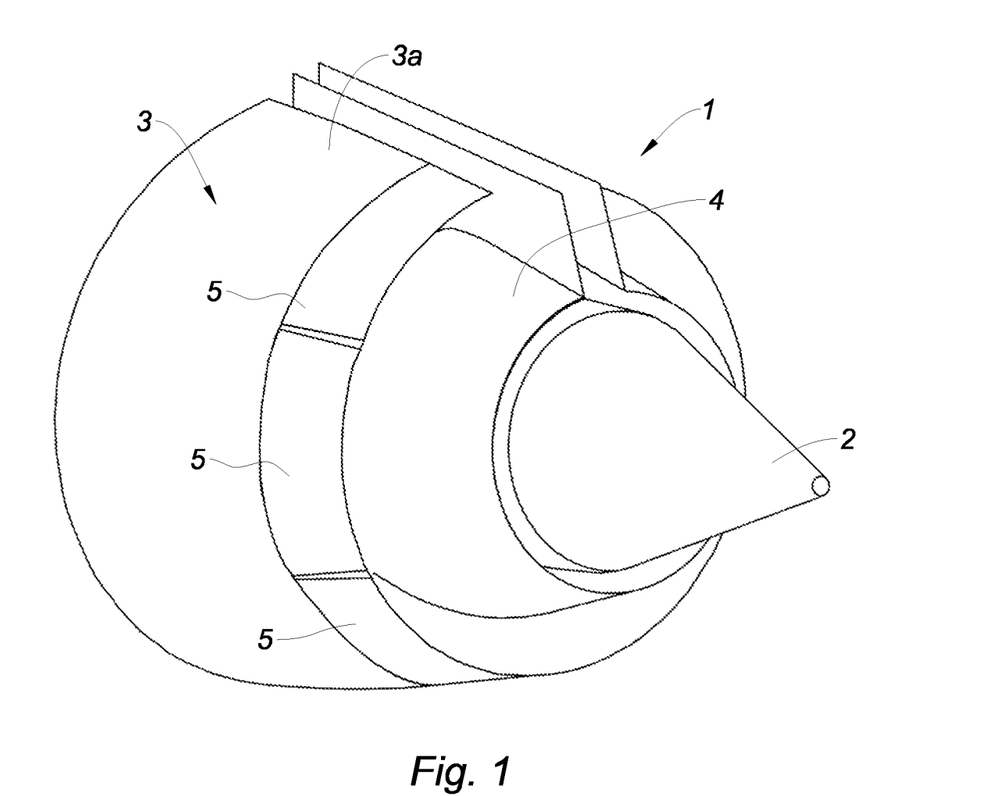
FIG. 1 is a general perspective representation of a downstream section of a nacelle for a turbojet engine, equipped with an adaptive nozzle with rotating flaps.

Referring to FIG. 1, schematically showing part of a nacelle 1 for a turbojet engine 2 comprising an inner fixed structure 4 surrounding a rear part of the turbojet engine 2 defining together with an outer structure 3 a flow path of a secondary flow of the turbojet engine.

The outer structure 3 comprises at least one cowling 3a extended in its downstream terminal part by an assembly of flaps 5 forming an ejection nozzle of the secondary air flow.

The outer structure 3 could be equipped with a thrust reverser device and the cowling 3a could then be movable in translation along a longitudinal direction of the nacelle.

In accordance with the framework of the present disclosure, the ejection nozzle is an adaptive nozzle enabling to modify the ejection section of the air flow at the outlet of the flow path of the secondary flow and to adapt it depending on different flight phases.

To this end, the flaps 5 are movably mounted relative to the cowling 3a and relative to a nominal operation position.

In accordance with the present disclosure, the flaps 5 are pivotally and translatably hinged relative to the cowl 3a.

Thus, the flaps 5 can be moved pivotally or in translation depending on the desired variation of section, and in one form, pivotally to reduce the nozzle section and in translation to increase said section.

More particularly, during an increase of the ejection section by downstream translation of the flap 5, it could be expected that the displacement of said flap opens a passage between the cowl 3a and an upstream end of this flap 5.

Thus, the flap 5 is movable in translation between a closed position in which it comes in continuity to the cowling 3a and an open position in which it opens an exhaust space between itself and said cowling 3a.

Several forms of the present disclosure will now be described.

A first form is shown in FIGS. 2 to 7.

Figure 2:
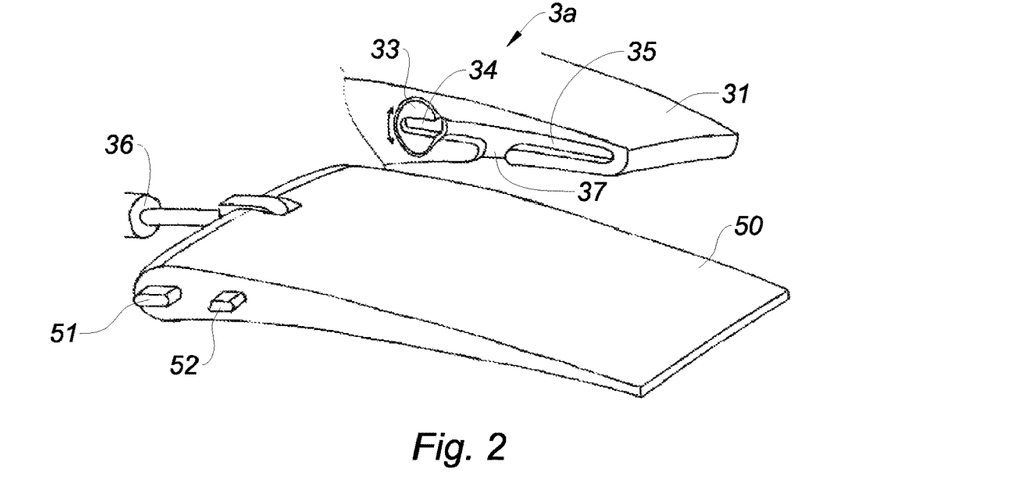
FIG. 2 is a partial schematic representation of a first form of the present disclosure.
Figure 3:
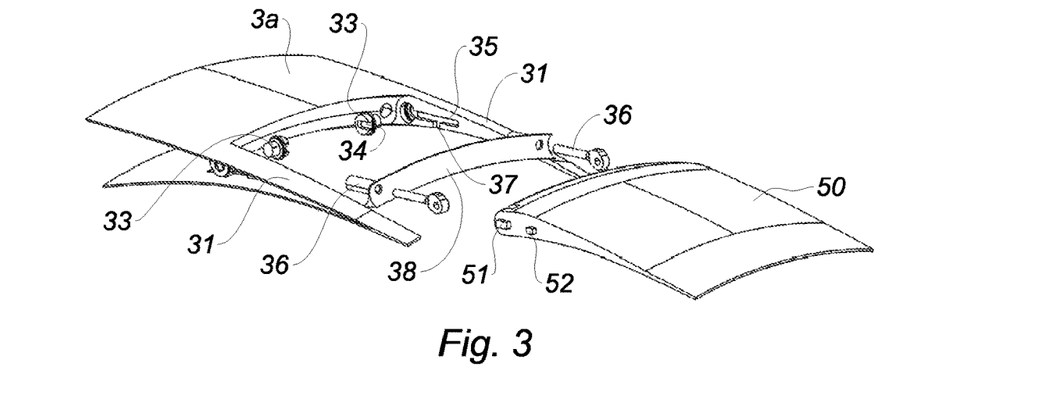
FIG. 3 is an exploded view of the form of FIG. 2.

FIGS. 2 and 3 show the hinge structure of a flap 50 on the cowl 3a while FIGS. 4 to 7 show several steps of displacement of the flap 50.

As shown in FIGS. 2 and 3, the flap 50 is mounted in the continuity to the cowling 3a between two lateral extensions 31 of the latter extending on either sides along the flap 50 and intended to serve as support for its hinge.

To do this, the flap 50 has a rotation index 51 able to cooperate with a corresponding rotation pad 33 of the associated lateral extension 31.

This rotation index 51 is received, when the flap 50 is in the nominal position, inside a corresponding notch 34 of the rotation pad 33.

The notch 34 opens onto a guide rail 35 extending along the lateral extension 31.

This rail is able to receive the rotation index 51 and consequently to guide the nozzle flap 50 in translation during a variation of the nozzle section by translating said flap 50.

The translation driving is provided by a cylinder-type actuating means 36 or translation links.

The flap 50 is equipped with a complementary translation index 52.

This translation index 52 is received, when the flap 50 is in the nominal position, inside the guide rail 35.

In order to enable the rotation of the flap, the guide rail has a lateral notch 37 designed to allow the passage of the translation index 52 during a variation of the nozzle section by pivoting the flap 50.

It will be noted that, when the flap 50 is in the nominal position, the sealing between said flap 50 and the cowl 3a could be provided by means of a profiled seal 38 (or spoiler), made particularly of elastomeric material.

Figure 4:
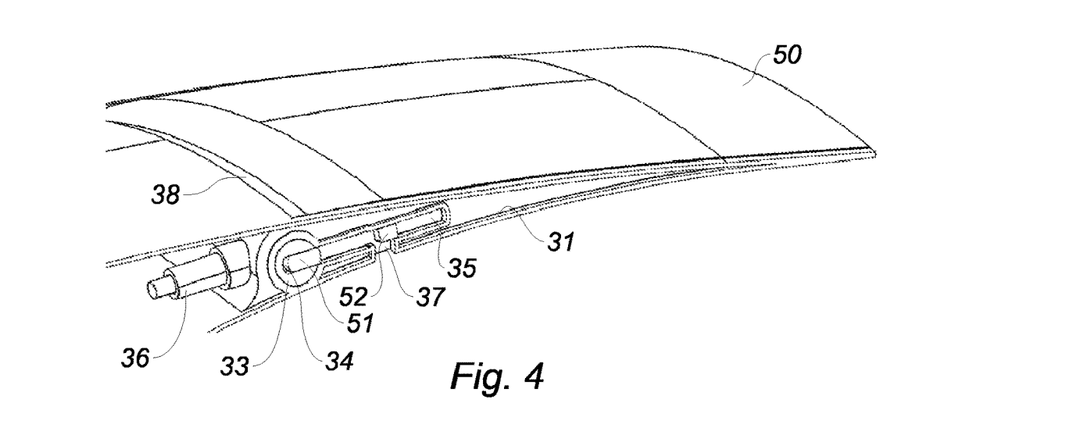
FIGS. 4 to 7 are longitudinal section views of a flap of the nozzle of FIG. 2 at different operation steps.

FIG. 4 shows the flap 50 in the nominal position.

In this position, the rotation index 51 is positioned in the notch 32 and is slightly engaged in the rail 35 in order to block the pivoting and a holding of the flap 50.

Similarly, the translation index 52 is in position inside the guide rail 35 slightly recessed from the lateral notch 37.

Figure 5:
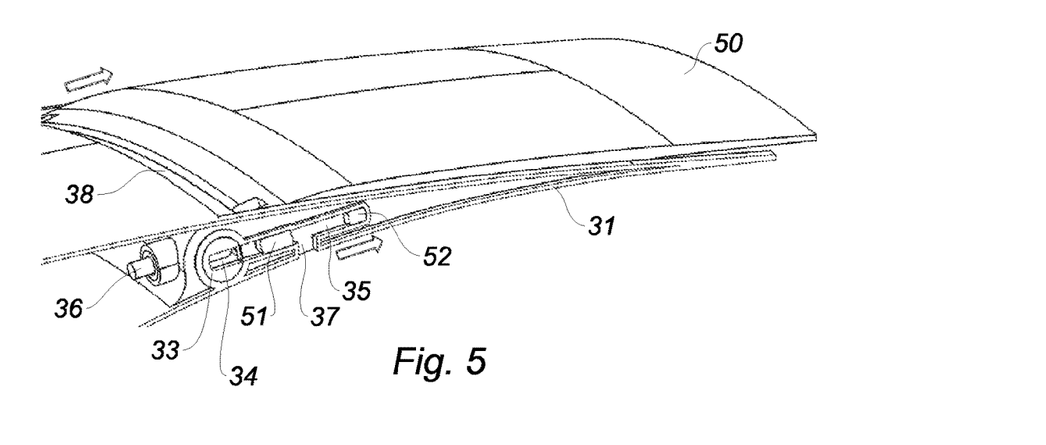

FIG. 5 shows a section increase obtained by translating downstream the flap 50.

In this position, the rotation index 51 is no longer located in the notch 34 of the rotation pad 33 but has moved downstream and is engaged in the guide rail 35.

This same applies to the translation index 52 which has moved downstream inside the guide rail 35.

Figure 6:
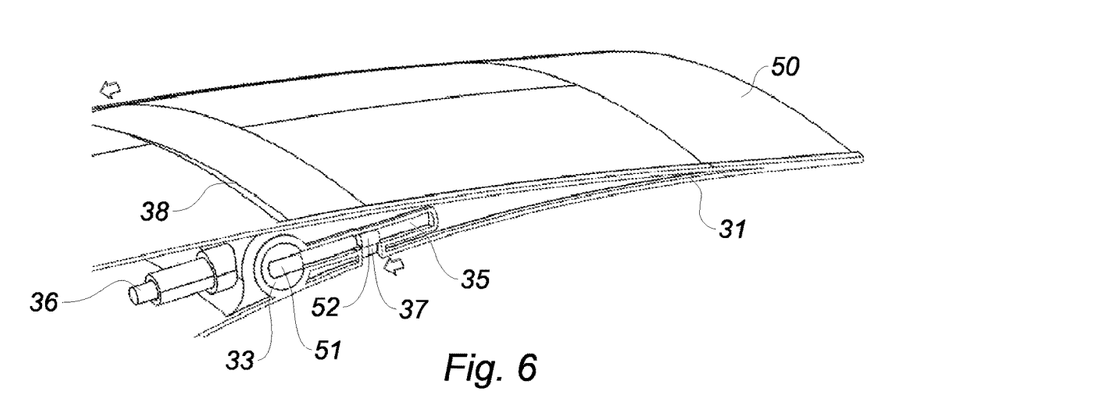

FIG. 6 shows the return of the flap 50 in the reduced nominal position enabling a pivoting of the flap 50.

In this position, the flap has been slightly raised upstream so that the rotation index 51 is positioned in the notch 32 of the rotation pad 33. The translation index 52 is also in slightly raised position so as to be accurately located opposite to the lateral notch 37.

Figure 7:
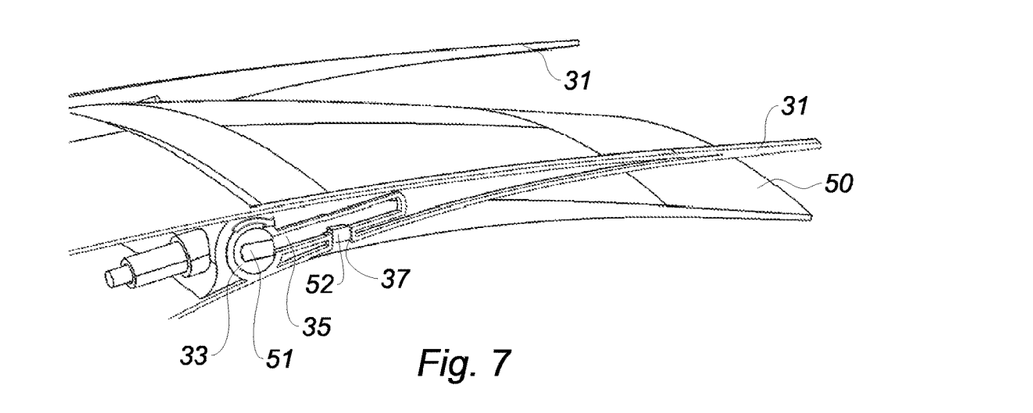

The flap may then pivot as shown in FIG. 7.

The rotation pad 33 is used to pivotally drive the flap 50 by means of its rotation index 51.

In doing so, the translation index 52 comes out of the rail 37 through the lateral notch 37.

FIGS. 8 to 11 show a second form to simplify the actuation of the nozzle flap by resorting to a single translating link.

FIGS. 8 to 11 show a flap 500 substantially operating on the same principle as the previous flap 50, and particularly having a rotation index 51 and a translation index 52 cooperating with a rotation pad 333 and a guide rail 35 having a lateral notch 37.

The rotation pad 333 comprises a main notch 34 for the rotation of the rotation index.

The driving of the flap 500 differs from the driving of the flap 50 mainly in that the nacelle, and more particularly the lateral extension of the cowl extending along the flap 500, has an additional slide 135 extending along the translation direction of the flap 500, said additional slide being ended upstream by a corresponding off-centered notch 134 in the rotation pad 333.

This additional slide 135 and corresponding off-centered notch 134 form an upstream abutment and a downstream abutment for one end 138 of a drive rod 139 of the flap 500.

This arrangement allows driving pivotally or in translation the flap by a simple translation movement, upstream or downstream, that is to say by the retraction or the deployment, of the drive rod 139.

Figure 8:
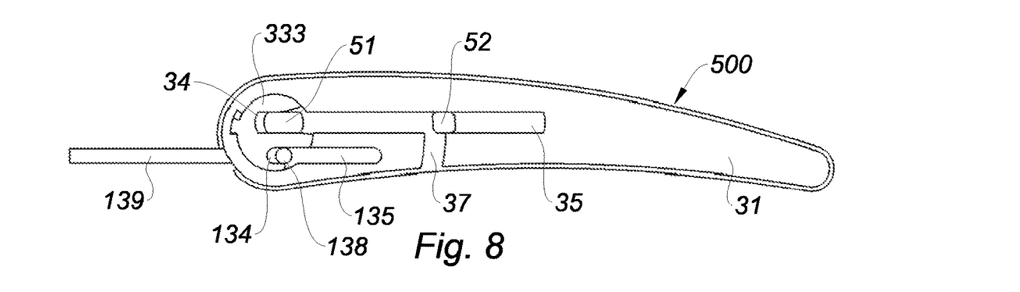
FIGS. 8 to 11 are longitudinal section views of a variant of a nozzle flap according to the first form of FIG. 2 at different operation steps.

FIG. 8 shows the flap 500 in the nominal position. As for the flap 50, the rotation index 51 is located inside the notch 34 of the rotation pad 333. The translation index 52 is located inside the guide rail 35 and is slightly offset relative to the lateral notch 37.

The end 138 of the rod 139 is located in the off-centered notch 134 of the pad 333.

Figure 9:
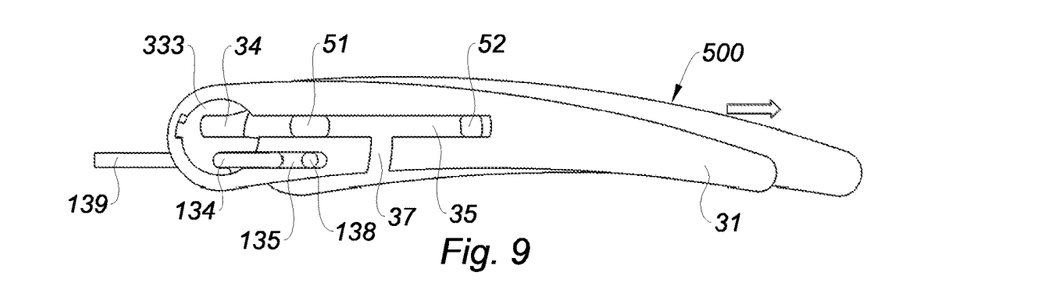

During an increase of the nozzle section and when the flap 500 is translated, the drive rod 139 moves longitudinally downstream and the end 138 passes from the off-centered notch 134 to the additional slide 135, in one form, until abutting against the downstream end of this slide 135.

Figure 10:
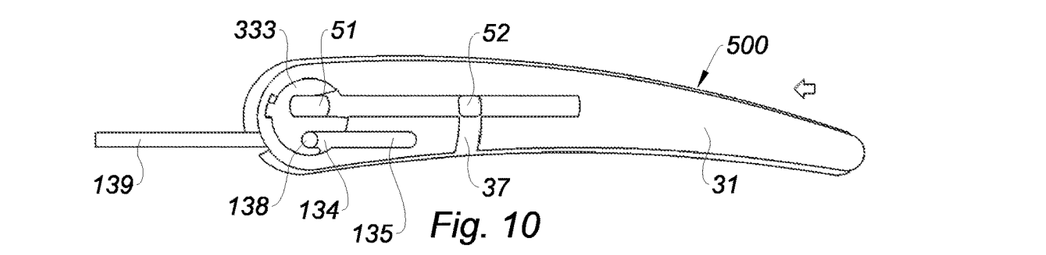

FIG. 10 shows the passage from the nominal position to a rotation position of the flap 500 in order to reduce the nozzle section.

As for the flap 50, the rotation index 51 is inside its notch 34 and the translation index is brought opposite to the lateral notch 37.

The end 138 of the drive rod 139 is also raised inside the off-centered notch 134 and abuts against an upstream end of the latter.

Figure 11:
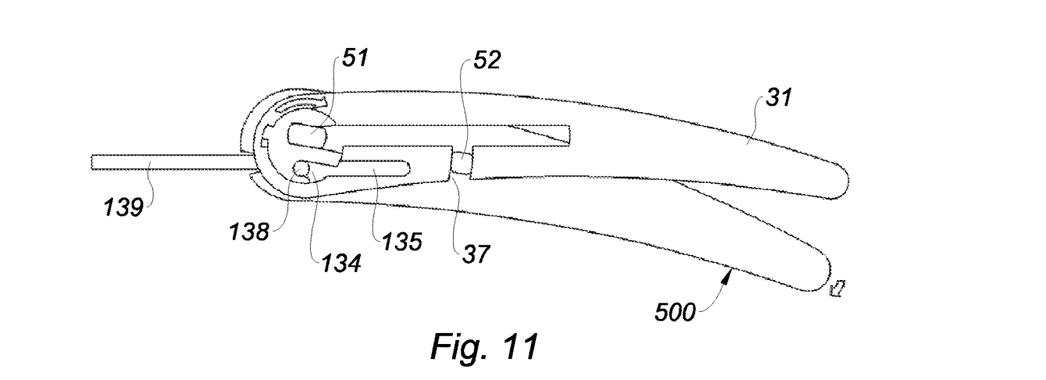

FIG. 11 shows the rotation of the flap 500.

The notch 134 being off-centered on the rotation pad 333, an additional traction of the rod 139 and of its end 138 causes the rotation of the pad in the corresponding direction, which causes the pivoting of the flap 500.

Figure 12:
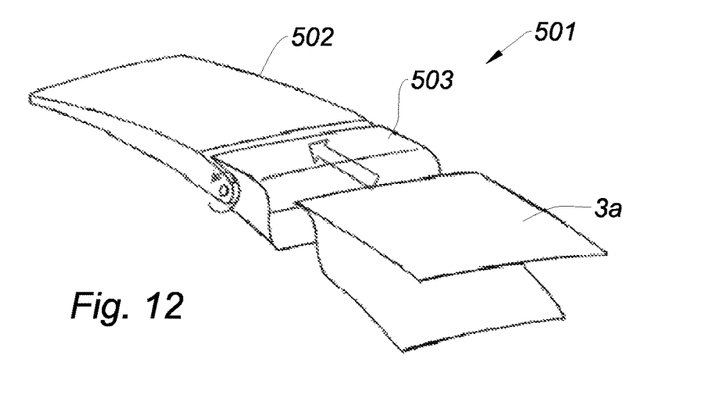
FIGS. 12 to 14 are views of the nozzle flap according to other forms of the present disclosure.
Figure 13:
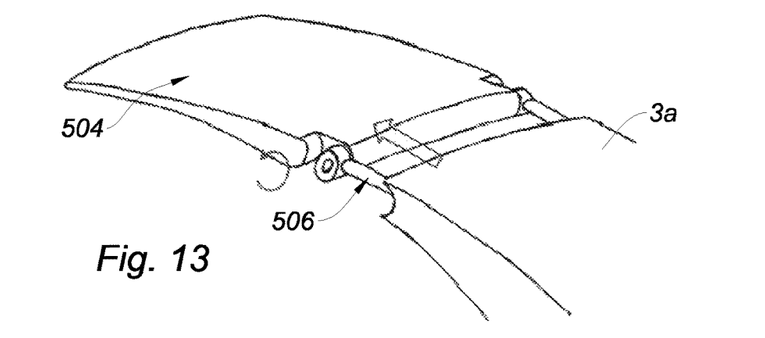
Figure 14:
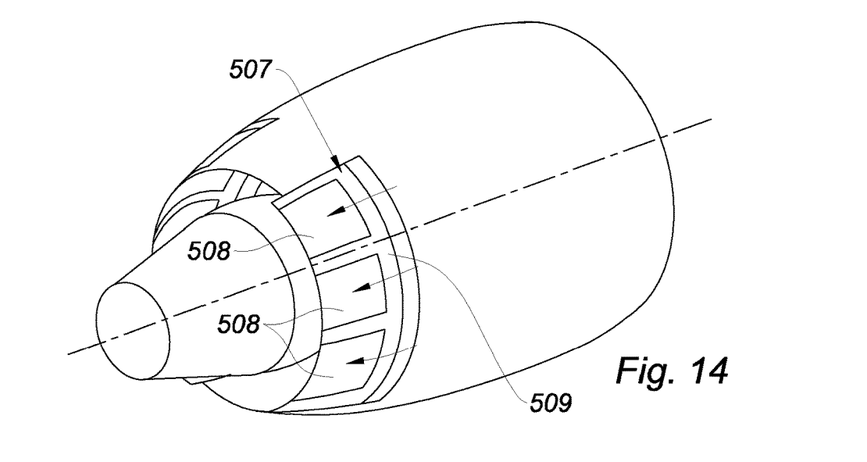

FIGS. 12 to 14 show variants.

FIG. 12 shows a nozzle flap 501 made in two parts, namely an upstream module 503, movable in translation, and pivotally supporting a terminal downstream module.

As shown in FIG. 14, this upstream module can support several terminal downstream modules. Thus, FIG. 14 shows a substantially semi-cylindrical flap 507 comprising an upstream module 509 able to translate and supporting several pivoting terminal modules 508.

The nacelle thus comprises a flap 507 forming a complete or truncated ring, or two lateral flaps 507, the one on the left, the other on the right.

FIG. 13 shows a flap 504 whose translation actuating means 506 also support pivots of the flap 504. This allows particularly reducing the size of the flaps and of their overall-dimension.

FIGS. 15 to 18 show a third form.

FIGS. 15 to 18 show a flap 600 operating substantially on the same principle as the previous flap 50, and having a guide slide 635, a control slide 35, a rotation pad 633 and a tilting slide 636 of the flap 600.

As previously, the rotation pad 633 and the control slide 35 receive a rotation index 51 mounted on the flap 600.

A single control rod 637 able to be actuated in translation has a tilted terminal part cooperating prior to the guide slide 635 and the tilting slide 636.

Figure 15:
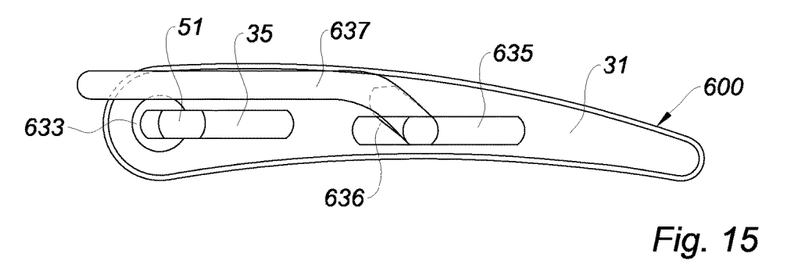
FIGS. 15 to 18, 19 to 22 and 23 to 26 are views of additional variants at different operation steps.

FIG. 15 shows the flap 600 in a neutral position. The rotation index 51 is located astride between the rotation pad 633 and the control slide 35 thereby preventing any pivoting of the flap 600.

Figure 16:
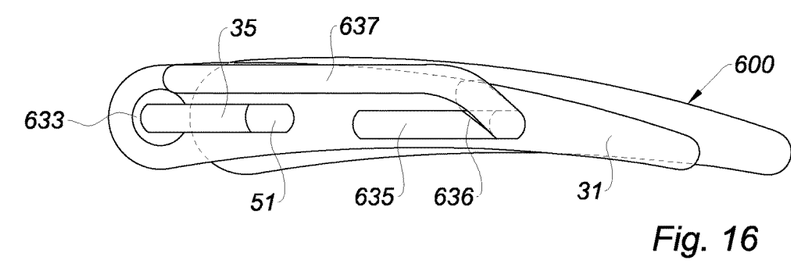

FIG. 16 shows the flap 600 in an increased section position. The control rod 637 is translated downstream and the rotation index 51 is guided by the control slide 35.

Figure 17:
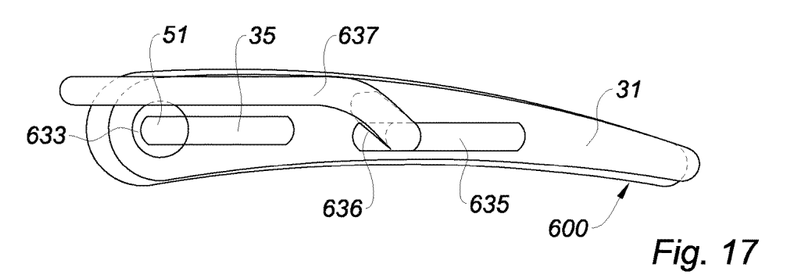

FIG. 17 shows the flap in the reduction start position of the nozzle section. The control rod 637 is retracted such that the rotation index 51 is inside the rotation pad 633 and comes out of the control slide 35. In so doing, it allows a pivoting of the flap 600.

Figure 18:
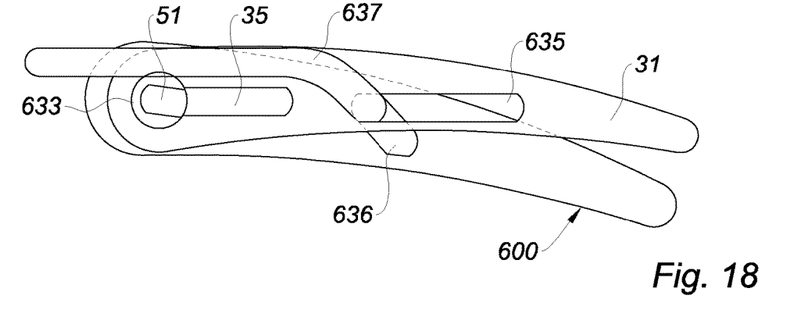
Figure 19:
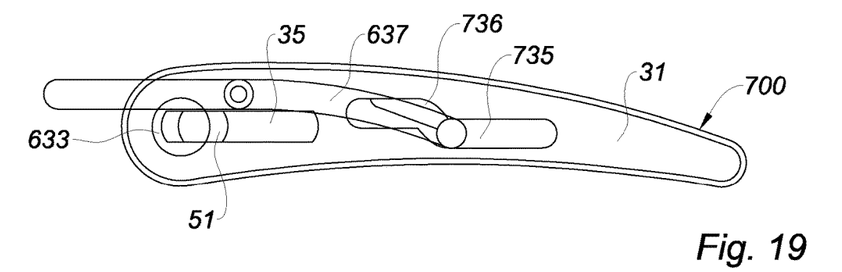
Figure 20:
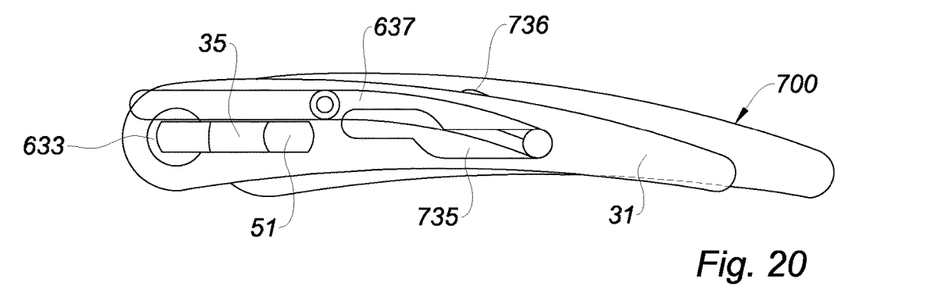
Figure 21:
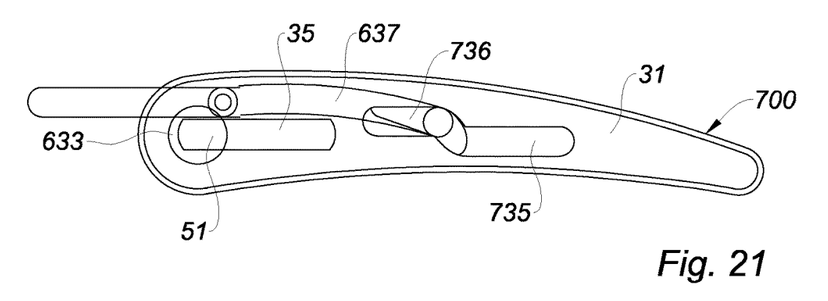
Figure 22:
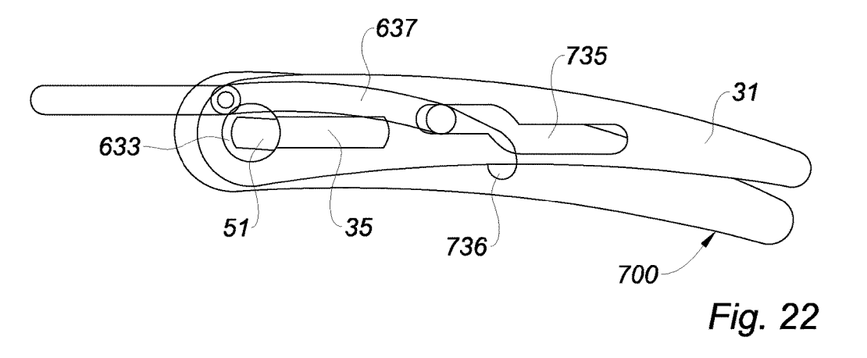
Figure 23:
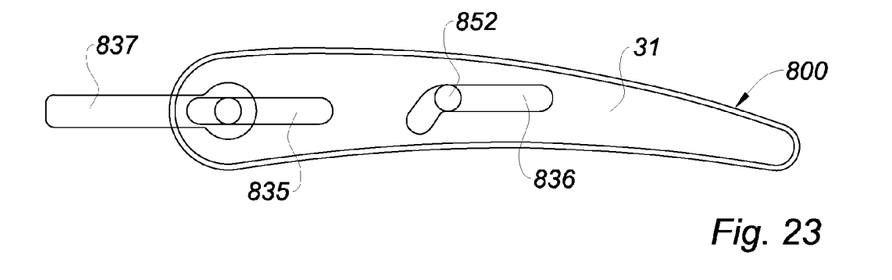
Figure 24:
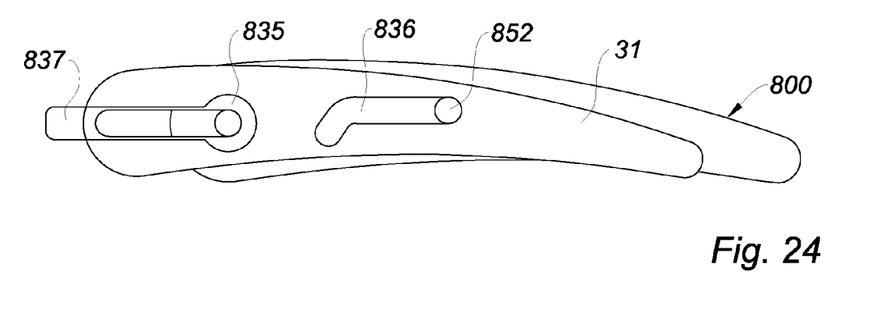
Figure 25:
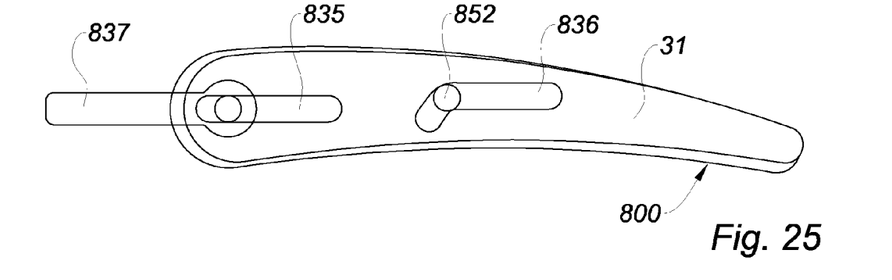

FIG. 18 shows this step of pivoting of the flap.

The rotation index 51 being in upstream abutment inside the rotation pad 633, an additional retraction of the control rod 637 causes the pivoting of the flap by means of the tilting slide 636 of the flap 600.

As shown, this form is based on a single translating control matching the guide slide 635 on the nacelle side (extension 31) with the tilting slide on the flap 600 side.

A limitation of this form lies in the fact that the direction of the forces exerted by the control rod when returning the flap to the neutral position from the «reduced section» or «increased section» positions is not necessarily compatible with the desired movement of the flap.

FIGS. 19 to 22 show a fourth form particularly to satisfy the limitation of the previous form.

FIGS. 19 to 22 show a flap 700 operating substantially on the same principle as the previous flap 600.

The difference substantially lies in the fact that it comprises a guide slide 637 (on the extension 31 side of the nacelle) which integrates a portion forming substantially a Z-shape with a setback inducing a level change.

It also comprises a tilting slide 736 (on the flap 600 side) which also has a terminal setback.

This terminal setback on the tilting slide of the flap reorients the control force in translation of the flap and thus allows reducing and even deleting any parasitic component.

The setback on the guide slide, on the nacelle side, allows the control rod 637 to pass the bearing zone corresponding to the setback on the titling slide and thus to perform the translation/rotation transition of the flap 600.

This form is however more complex than the previous ones and requires accurate adjustments.

FIGS. 23 to 26 show a fifth form different relative to the previous forms.

FIGS. 23 to 26 show a flap 800 actuated by means of a translating control link 837 whose one terminal index slides inside a control slide 835 of the flap 800.

The control slide 835 is substantially straight.

The flap 800 has downstream a secondary index 852 intended to enable its pivoting.

Figure 26:
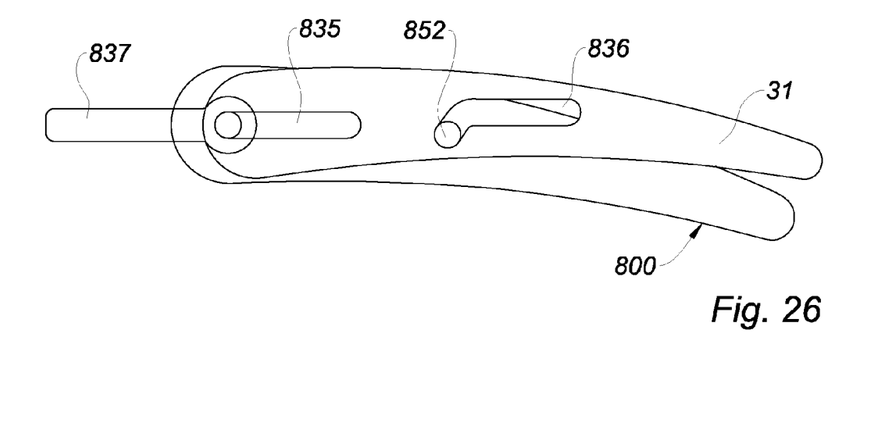

The index 852 cooperates with a corresponding guide slide 836 of the nacelle (on the extension 31) comprising a substantially straight downstream portion corresponding to a translation movement of the flap 800 and an tilted upstream portion corresponding to a pivoting movement of the flap 800. This pivoting phase is shown in FIG. 26.

Although the present disclosure has been described with a particular form, it is obvious that it is by no means limited and that it comprises all the technical equivalents of means described as well as their combinations if the latter fall within the scope of the present disclosure.

What is claimed is:

1. A nacelle for a turbojet engine having a downstream section comprising at least one cowling ended by at least one hinged flap forming a nozzle,
    wherein said at least one hinged flap is pivotally and translatably hinged relative to said at least one cowling;
    wherein the nacelle comprises at least one guide rail, and a rotation pad coupled to the nacelle is rotatable relative to the guide rail;
    wherein said at least one hinged flap comprises at least one rotation index configured to cooperate with the rotation pad, and when said at least one hinged flap is in a nominal position, said at least one rotation index is received inside a notch of the rotation pad; and
    wherein said notch opens onto said at least one guide rail, and said at least one guide rail is configured to receive the rotation index from the notch and to guide said at least one hinged flap in translation during a variation of the nozzle by translation of said at least one hinged flap.

2. The nacelle according to claim 1, wherein said at least one hinged flap is movable in translation between a closed position wherein said at least one hinged flap forms an aerodynamic continuity with said at least one cowling and an open position where said at least one hinged flap is configured to increase an outlet section and open an exhaust space between said at least one hinged flap and said at least one cowling to create a tertiary nozzle.

3. The nacelle according to claim 1, wherein the downstream section comprises at least one thrust reverser device.

4. The nacelle according to claim 1, wherein said at least one hinged flap comprises at least one translation index received inside said at least one guide rail when said at least one hinged flap is in the nominal position,
    and said at least one guide rail further comprises a lateral notch configured to allow the passage of said at least one translation index during a variation of the nozzle that pivots said at least one hinged flap.

5. The nacelle according to claim 1, wherein said at least one hinged flap is pivotally driven by said rotation pad.

6. The nacelle according to claim 1, wherein said at least one hinged flap is configured to perform a thrust vectoring.

* * * * *